UNITED STATES PATENT OFFICE.

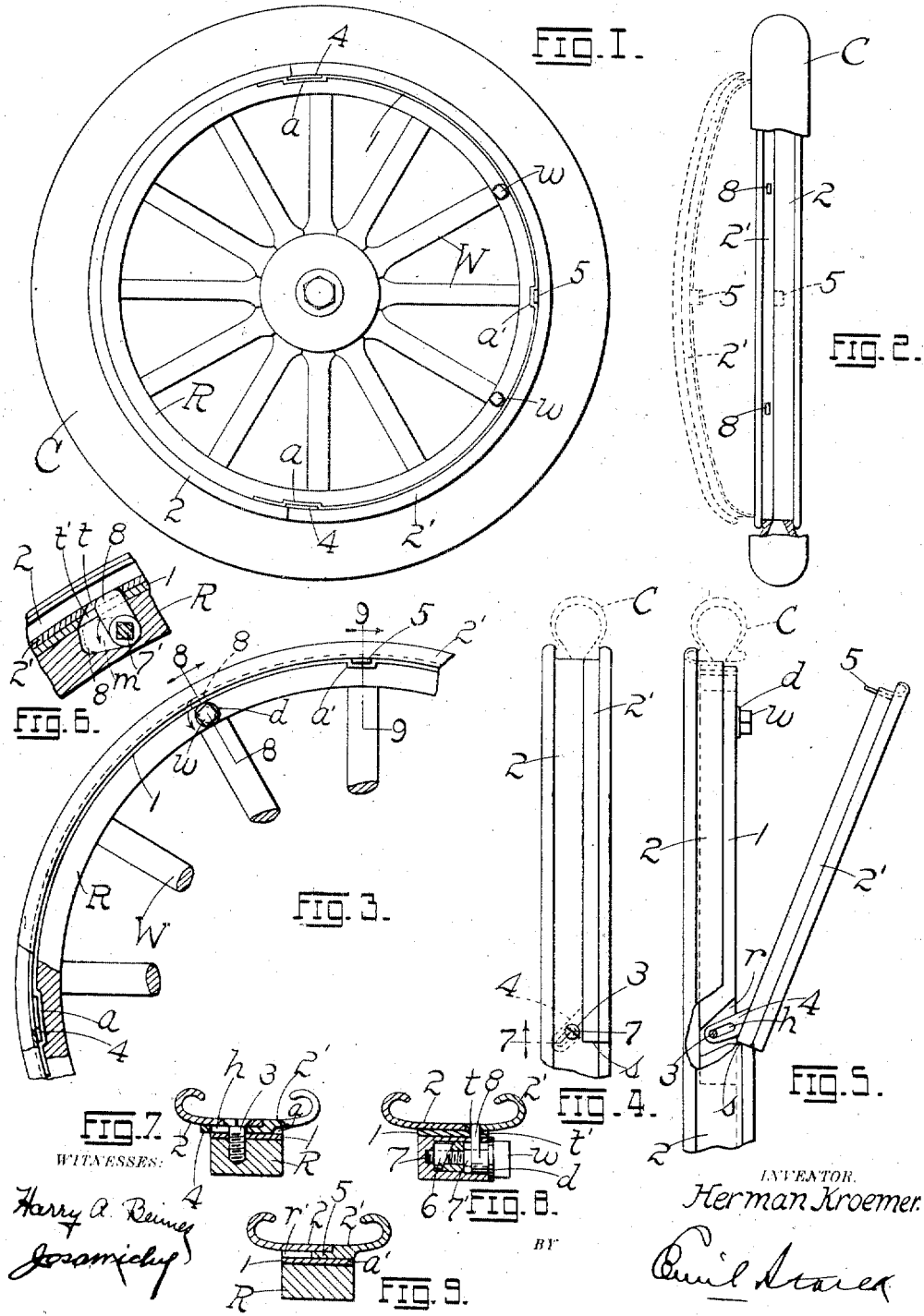

HERMAN KROEMER, OF ST. LOUIS, MISSOURI.

CLENCHER-RIM.

1,246,115.    Specification of Letters Patent.    Patented Nov. 13, 1917.

Application filed March 9, 1917. Serial No. 153,646.

*To all whom it may concern:*

Be it known that I, HERMAN KROEMER, a citizen of the United States, residing at St. Louis, State of Missouri, have invented certain new and useful Improvements in Clencher-Rims, of which the following is a full, clear, and exact description, reference being had to the accompanying drawings, forming a part hereof.

My invention has relation to improvements in clencher rims for pneumatic tires; and it consists in the novel features of construction more fully set forth in the specification and pointed out in the claim.

The present improvement is directed to what are known as detachable clencher rims in contradistinction to fixed rims on the one hand and "demountable" rims (and tires) on the other hand, the object of the invention being to construct a clencher rim which need not be detached in its entirety from the felly of the wheel when applying or removing the tire, it being sufficient under my invention to release only the movable section of said rim. Preferably, the movable section is hinged at its ends to the felly of the wheel, said section in circumferential extent being a little over one hundred and eighty degrees or somewhat over one-half of the circumference of the wheel. Preferably the hinged (or equivalent) connection of the clencher rim section with the wheel is a permanent one, though I do not wish to be understood as restricting the invention to such permanent connection, it being possible to detach said section from the wheel altogether without a departure from the spirit of my invention. A further object of the invention is to provide a movable clencher rim section which may be quickly and securely locked to the wheel once the tire is in place on the rim. A further object is to provide suitable means for preventing displacement of said movable section in any direction, once the same has been locked to the wheel. The advantages of the invention will be fully apparent from the following detailed description in connection with the accompanying drawing in which—

Figure 1 represents a side elevation of a vehicle wheel showing my invention applied thereto; Fig. 2 is an edge view with part of the tire removed; Fig. 3 is an enlarged side elevational detail showing a portion of the movable section of the clencher rim, parts being in section; Fig. 4 is an edge view of the clencher rim; Fig. 5 is a similar view with the movable or hinged section of the clencher rim swung to open position; Fig. 6 is an enlarged sectional detail showing the locking latch for the movable section of the clencher rim, the section being taken circumferentially of the rim; Fig. 7 is a cross-sectional detail on the line 7—7 of Fig. 4; Fig. 8 is a cross-sectional detail on the line 8—8 of Fig. 3; and Fig. 9 is a cross-sectional detail on the line 9—9 of Fig. 3.

Referring to the drawings, R represents the felly of a conventional vehicle wheel W, and C the usual pneumatic or equivalent tire all as well understood in the art. Disposed on the periphery of the felly and extending a distance slightly over one hundred and eighty degrees of the circumference thereof, and countersunk so as to come flush with the outer surface of the remaining peripheral portion of the felly is a band or wearing plate 1, the band being provided at points adjacent the terminals with offsets $a$ forming suitable grooves or recesses $r$, and being provided at an intermediate point or at the center with a similar offset $a'$ forming a similar groove or recess $r'$. The band 1 is of the same width as the felly and forms in effect a metallic facing therefor, and covers a little more than one hundred and eighty degrees of the felly's circumference. Encompassing the felly (including of course the band 1) is the fixed section 2 of the clencher rim, this section in no wise differing in construction from the usual or conventional form of clencher rim except that in the present case the portion of the rim surrounding the band 1 covers only about two thirds the width of the band (Fig. 5) the remaining third being covered by the rim portion of the movable section 2', so that when the two sections are assembled by bringing the movable section over the band 1 and in contact with the narrow portion of the fixed section 2, the two rim sections will form in effect a single clencher rim differing in appearance in no wise from the conventional fixed clencher rim well known in the art (Fig. 4).

The narrowing of the fixed section 2 of the clencher rim opposite the band 1 results in the formation of shoulders or offsets *s* on the rim at points where the latter resumes its full width (Fig. 4) the grooves *r* being disposed contiguous to said shoulders and having their upper walls inclined thereto. Disposed across each groove *r* and extending through the peripheral portion of the clencher rim section 2, through the band 1 and into the felly R, is a screw or pin 3, said pin passing loosely through an elongated slot *h* of the terminal lug or toe-piece 4 secured to or formed on the movable clencher rim section 2′, the said toe-piece and slot thereof being inclined to conform to the inclination of the top wall of the recess or groove *r*. The toe-pieces 4 project beyond the inner edge of the clencher rim section 2′, and when the toe pieces have fully entered their respective recesses *r* (the slots *h* being of sufficient length to permit of the necessary travel to that end), the ends of the section 2′ will engage or rest on the shoulders or offsets *s* (Fig. 4) and the free edges of the section 2′, and of the narrow portion of the section 2 will come together and be properly assembled for clenching the tire between them (Fig. 4). Secured to or formed on the section 2′ at a point opposite the recess *r*′ is a lug 5 which, with the assembling of the clencher rim sections enter said recess.

To lock the section 2′ when once properly adjusted to the section 2, I provide the section 2′ on each side of the lug 5, with a circumferentially elongated slot *t*, the band 1 being provided with an alining or registering slot *t*′ radially opposite thereto (Fig. 6). Formed in the felly opposite each slot *t*, *t*′, (when the parts are assembled) is a socket provided with an interiorly screw-threaded sleeve 6 in which operates the inner threaded portion of a screw-stem 7, the medial portion 7′ being polygonal or square and carrying a latch 8 opposite the slot *t*, *t*′, which the latch may freely enter when the screw is turned in proper direction. To manipulate the screw the latter terminates on the outside of the felly in a square head *w* for the application of a suitable wrench, a washer *d* being interposed between the head *w* and the face of the felly. By turning the screw 7 so as to swing the latch 8 into the slot *t*, *t*′, the rim section 2′ will be locked, the turning of the screw in its bushing 6 causing the screw to at the same time advance longitudinally. This has the effect of not only swinging the latch into the slot *t*, *t*′, but forcing the side of the latch against one of the side walls of the slot, so that a firm locking effect is the result.

The operation will be obvious from the foregoing description and briefly stated is as follows: By turning the locking latch 8 out of its slot *t*, *t*′, or to the dotted position shown in Fig. 6, the section 2′ is released and may be pulled and swung outwardly from its locked position shown in Fig. 4 to the unlocked and detached position shown in Fig. 5. This permits the tire C to be slipped off the rim as clearly obvious from the drawings. In swinging the hinged section 2′ to the position indicated in Fig. 5, the pins 3 are brought to the inner ends of the slots *h* of the toe-pieces 4, the latter freely playing in the recesses *r* formed by the offsets *a* of the band 1. In this position too, the section 2′ rests on the shoulders *s*, and is prevented from dropping altogether by the pins 3 engaging the inner terminals of the slots *h*. By making the section 2′ of a circumferential dimension in excess of one hundred and eighty degrees, it facilitates the mounting and removal of the tire C. When the section is swung to closed position the tongue or lug 5 enters the recess *r*′ formed in the offset *a*′ of the band 1 (Fig. 9), being confined between the section 2 and the band 1 and preventing any possible displacement of the section 2′ in the plane of rotation of the wheel. The latches 8 on the other hand prevent any angular displacement of the section 2′ (that is to say an outer swinging thereof) and the inclined recesses or slots *r* and pins 3 prevent any displacement at the hinge portions of the hinged section of the rim. When the latch 8 is swung open it is received in a pocket *m* in the felly (Fig. 6). In mounting the tire, the reverse of the operations described is necessarily resorted to as obvious from the drawings. I do not wish to be restricted to the details shown as they may in a measure be departed from without in any wise affecting the nature or spirit of my invention.

Having described my invention what I claim is:

In combination with a wheel felly, a band flush with the periphery of the felly and extending through a given arc of its circumference, a fixed clencher rim section encompassing the felly and having a rim portion the full width of the felly at points beyond the band and having a narrow portion extending only partially across the width of the band thereby forming shoulders between the narrow and wide portions of said section, a movable clencher rim section extending across the portion of the band left uncovered by the fixed section, slotted toe pieces terminating the movable clencher rim section, the band aforesaid being provided with offsets forming grooves adjacent the shoulders aforesaid for the reception of the toe pieces, securing pins traversing the slots of the toe pieces, and means for locking the movable clencher rim section to the felly.

In testimony whereof I affix my signature in presence of two witnesses.

HERMAN KROEMER.

Witnesses:
EMIL STAREK,
JOS. A. MICHEL.